(12) United States Patent
Emerson

(10) Patent No.: US 8,439,541 B2
(45) Date of Patent: May 14, 2013

(54) DECORATIVE LED TAIL LIGHT ARRANGEMENT

(76) Inventor: Andrew Emerson, Meridan, MS (US)

( * ) Notice: Subject to any disclaimer, the term of this patent is extended or adjusted under 35 U.S.C. 154(b) by 166 days.

(21) Appl. No.: 12/972,494

(22) Filed: Dec. 19, 2010

(65) Prior Publication Data

US 2012/0155105 A1    Jun. 21, 2012

(51) Int. Cl.
*B60Q 1/44* (2006.01)
*B60Q 1/34* (2006.01)
*B60Q 1/22* (2006.01)

(52) U.S. Cl.
USPC .............................. 362/541; 362/543; 362/545

(58) Field of Classification Search .................. 362/487, 362/540, 541, 543, 544, 545
See application file for complete search history.

(56) References Cited

U.S. PATENT DOCUMENTS

| 2,343,754 A * | 3/1944 | Donley | 362/540 |
| 2002/0012251 A1 * | 1/2002 | Lee | 362/540 |

\* cited by examiner

*Primary Examiner* — David V Bruce
(74) *Attorney, Agent, or Firm* — Jerry Haynes; Law Offices of Jerry D. Haynes, P.A.

(57) ABSTRACT

A decorative LED tail light arrangement comprising a decorative tail light attached to a tail light panel of a vehicle, where the decorative tail light is arrange at one end of the tail light panel and an second decorative tail light is attached at an opposing end, a plurality of LED turning lights attached to the decorative tail light, where the plurality of LED turning lights are arranged in a mirrored double-C pattern; and a plurality of LED brake lights attached to the decorative tail light, wherein the plurality of LED brake lights are arranged to surround the plurality of LED turning lights.

9 Claims, 3 Drawing Sheets

DECORATIVE LED TAIL LIGHT ARRANGEMENT

BACKGROUND OF THE INVENTION

1. Field of the Invention

The present invention relates to a tail light arrangement for a vehicle wherein a set of LED lights are used to illuminate a brighter light color than conventional tail lights and the tail light arrangement is configured as a mirrored double-C light pattern.

2. Description of Related Art

Limited developments have been made with the general size, shape, configuration and illumination of today's vehicle lights. Generally, this is due to industry standards that must be strictly followed but there is still room for customized or unique lighting assemblies. While unique features are a high priority of customization, vehicle safety is takes precedence to any modifications. Drivers want their cars to be noticed but not at the cost to themselves, their vehicles or the surrounding drivers.

A concern among drivers is whether their lights are illuminating, how bright the lights are, and do the other vehicles notice. Conventional tail lights use non-halogen light bulbs to illuminate the turn signals, brake lights and reverse lights. These lights are highly functional but are sometimes slow to react to the brake and turn wiring of the vehicle. A growing light source has been light emitting diodes (LED) because of their bright light quality, faster reaction time, long life span and the smaller packaging than the non-halogen lights. While LED tail lights are gaining popularity they have yet to become mainstream, and are only available to limited customization.

It would be desirable in the art to provide a LED tail light arrangement to better notify surrounding drivers of the vehicle's actions. It would also be beneficial in the art to provide a tail light assembly that is not only safe for the driver but also stylish for those drivers that wish to customize the look of their lighting.

SUMMARY OF THE INVENTION

An object of the present invention is to provide a decorative LED tail light arrangement that better notifies surrounding drivers of the braking and turning actions of the vehicle.

Another object of the present invention is to provide a customized and stylish configuration for the tail lights of the vehicle.

In view of the foregoing disadvantages inherent in the prior art, the purpose of the present disclosure is to provide a decorative LED tail light arrangement comprising a decorative tail light attached to a tail light panel of a vehicle, where the decorative tail light is arrange at one end of the tail light panel and an second decorative tail light is attached at an opposing end, a plurality of LED turning lights attached to the decorative tail light, where the plurality of LED turning lights are arranged in a mirrored double-C pattern, and a plurality of LED brake lights attached to the decorative tail light, wherein the plurality of LED brake lights are arranged to surround the plurality of LED turning lights.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DRAWINGS

The present invention relates to a tail light arrangement for a vehicle wherein a set of LED lights are used to illuminate a brighter light color than conventional tail lights and the tail light arrangement is configured as a mirrored double-C light pattern. The present invention discloses a decorative LED tail light arrangement to provide increased tail lighting during vehicle operation. The decorative LED tail light arrangement comprises a unique pattern for the individual LED lights to provide a user with a more customized and stylish tail light while still providing the necessary functions of turn signaling and brake illumination. The decorative LED tail light arrangement is powered by the internal battery of the vehicle, and may be adapted to fit various makes and models of the vehicles currently available on the market. Since the decorative LED tail light arrangement utilizes the bright illumination of LED lights the vehicles equip with the light arrangement project greater visibility to the surrounding vehicles thus promoting greater road safety for the driver.

Figure 1:
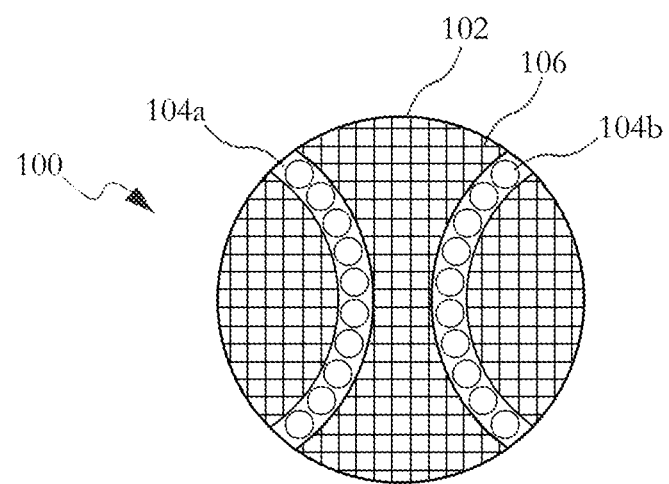
FIG. 1 depicts a perspective view of a decorative LED tail light arrangement in accordance with an exemplary embodiment of the present invention.
Figure 3:
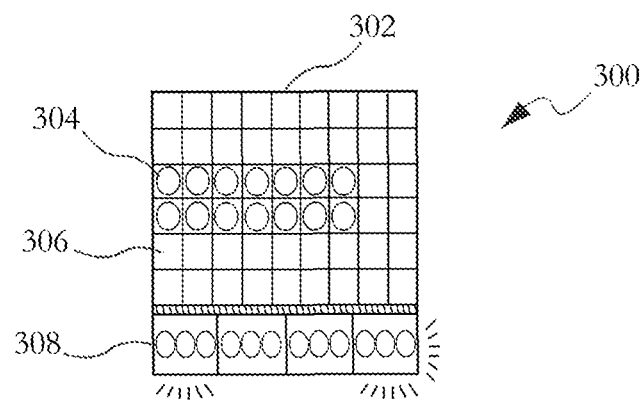
FIG. 3 depicts a perspective view of a decorative LED tail light arrangement in accordance with a second alternative embodiment of the present invention.

Turning now descriptively to the drawings, referring to FIG. 1, a perspective view of a decorative LED tail light arrangement (100) is shown in accordance with an exemplary embodiment of the present invention. The decorative LED tail light arrangement (100) includes a decorative tail light (102), which is assembled to fit a tail light panel of a vehicle. The decorative tail light (102) is attached to one end of the tail light panel while a second decorative tail light is attached to an opposing end. The decorative LED tail light arrangement (100) utilizes a plurality of LED lights to more brightly illuminate the tail light panel than the lights conventionally used. The decorative tail light (102) may include a plurality of LED turning lights (104a, 104b) (hereinafter LED turning lights) and a plurality of LED brake lights (106) (hereinafter LED brake lights). The decorative tail light (102) may be available as a circle (as shown), a rectangle (as shown in FIG. 3) or square depending on the preferences of a driver, or the specific makes and models of the vehicles.

The LED turning lights (104a, 104b) may be arranged as a mirrored double-C pattern wherein the LED turning lights (104a, 104b) start at opposing points on an upper portion of a peripheral edge of the decorative tail light (102). Then the LED turning lights (104a, 104b) curve towards each other towards a central point in the decorative tail light (102). Finally, the LED turning lights (104a, 104b) extend back out to opposing points on a lower portion of the peripheral edge of the decorative tail light (102) beneath where they originated to create a generally curved C-shape. The LED turning lights (104a, 104b) may illuminate an amber color in accordance with the industry standards. The LED turning lights (104a, 104b) provide a stylish yet useful way for a driver to indicate which way they are turning to give warning the surrounding vehicles.

Accordingly, the LED brake lights (106) are arranged to surround the LED turning lights (104a, 104b). The LED brake lights (106) fill in the areas of the decorative tail light (102) where the LED turning lights (104a, 104b) are not placed. The LED brake lights (106) illuminate a red light to comply with industry standards and are wired to shine brighter when the vehicle's brakes are applied.

Figure 2:
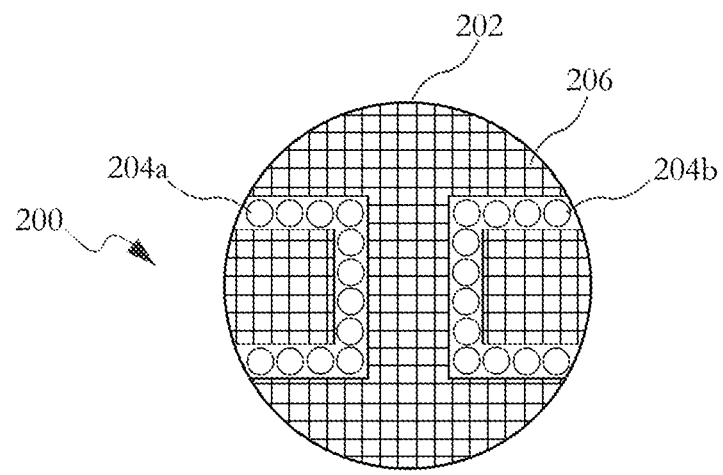
FIG. 2 depicts a perspective view of a decorative LED tail light arrangement in accordance with an alternative embodiment of the present invention.

Referring now to FIG. 2, a perspective view of a decorative LED tail light arrangement (200) is shown in accordance with an alternative embodiment of the present invention. The decorative LED tail light arrangement (200) includes a decorative tail light (202) with a generally circular shape like the first embodiment of the decorative tail light (100). The decorative tail light (202) includes a plurality of LED turning lights (204a, 204b) (hereinafter LED turning lights) and a plurality of LED brake lights (206) (hereinafter LED brake lights). The decorative tail light (202) is paired with a second decorative tail light (202) for mounting on opposing ends of a vehicle tail light panel.

The LED turning lights (204a, 204b) are arranged in the mirrored double-C pattern but comprise a more squared C-shape. The LED turning lights (204a, 204b) are arranged in a line wherein a top portion starts at an upper portion of a peripheral edge of the decorative tail light (202) and extend directly toward the opposing line. Then, the lines of LED turning lights (204a, 204b) extend down along side each other in a parallel fashion. Finally, the lines of LED turning lights (204a, 204b) extend back out towards the peripheral edge of the decorative tail light (202) along a lower portion. The LED turning lights (204a, 204b) illuminate an amber color to contrast a red color illuminated by the surrounding LED brake lights (206).

Referring to FIG. 3, a perspective view of a decorative LED tail light arrangement (300) is shown in accordance with a second alternative embodiment of the present invention. The decorative LED tail light arrangement (300) includes a decorative tail light (302) comprising a square shape. The decorative tail light (302) includes a plurality of LED turning lights (304) (hereinafter LED turning lights), a plurality of LED brake lights (306) (hereinafter LED brake lights) and a plurality of LED reverse lights (308) (hereinafter LED reverse lights). The LED turning lights (304) extend from a lateral edge of the decorative tail light (302) toward a central portion. The LED brake lights (306) surround the LED turning lights (304) on all sides except from where the LED turning lights (304) extended from the lateral edge of the decorative tail light (302). The LED turning lights (304) illuminate an amber color to contrast the surrounding LED brake lights (306) which illuminate a red color. Beneath the arrangement of LED turning lights (304) and the LED brake lights (306) are the LED reverse lights (308). The LED reverse lights (308) illuminate a white light in accordance with industry standards.

Figure 4:
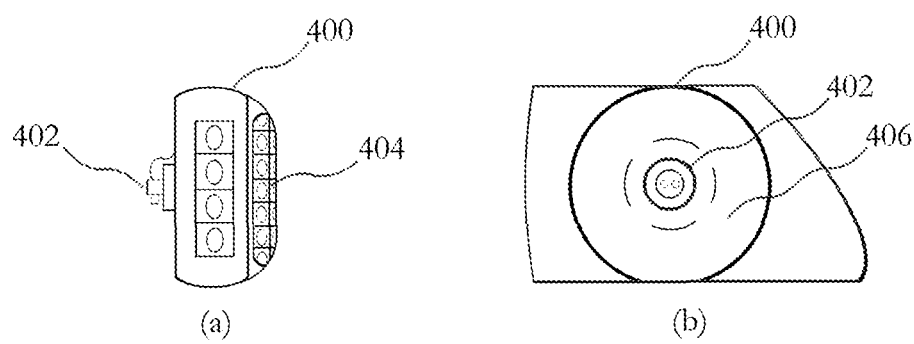
FIG. 4(a) depicts a side view of a tail light housing in accordance with an exemplary embodiment of the present invention.
FIG. 4(b) depicts a backside view of a tail light housing in accordance with an exemplary embodiment of the present invention.

Referring to FIG. 4(a), a side view of a tail light housing (400) is shown in accordance with an exemplary embodiment of the present invention. The tail light housing (400) accepts a decorative tail light (404) to attach it to a tail light panel of a vehicle. The tail light housing (400) may be snapped or fitted into place for easy installation. Accordingly, along a back portion of the tail light housing (400) is a factory plug (402) to power the decorative tail light (404). The factory plug (402) sends a plurality of signals into the tail light housing (400) to control how the decorative tail light (404) operates.

Accordingly, referring to FIG. 4(b), a backside view of the tail light housing (400) is shown in accordance with an exemplary embodiment of the present invention. The factory plug (402) is illustrated in a central portion of the tail light housing (400). The tail light housing (400) includes a LED load balancer (406) to help control the electricity that flows into the decorative tail light (404).

Figure 5:
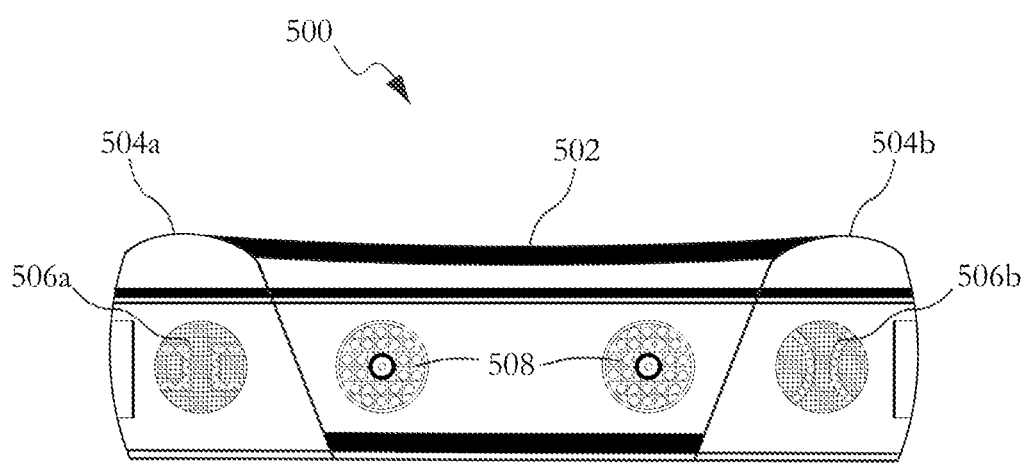
FIG. 5 depicts a tail light panel in accordance with an exemplary embodiment of the present invention.

Referring to FIG. 5, a tail light panel (500) is shown in accordance with an exemplary embodiment of the present invention. The tail light panel (500) comprises an elongated body including a central housing (502) and a pair of tail light housings (504a, 504b). The tail light panel (500) is attached above a bumper of a vehicle for better viewing to the surrounding vehicles. The central housing (502) may include a pair of reverse lights (508) that illuminate a white light. The pair of tail light housings (504a, 504b) house a pair of pair of decorative tail lights (506a, 506b). FIG. 5 illustrates how the pair of decorative tail lights (506a, 506b) are arranged with a first decorative tail light (506a) attached to one end of the tail light panel (500) while a second decorative tail light (506b) is attached at an opposing ends. The brightness illuminated from the pair decorative tail lights (506a, 506b) provide noticeable signaling for greater safety to the driver and surrounding vehicles.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A decorative LED tail light arrangement comprising:
   a decorative tail light attached to a tail light panel of a vehicle, where said decorative tail light is arrange at one end of said tail light panel and an second decorative tail light is attached at an opposing end;
   a plurality of LED turning lights attached to said decorative tail light, where said plurality of LED turning lights are arranged in a mirrored double-C pattern; and
   a plurality of LED brake lights attached to said decorative tail light, wherein said plurality of LED brake lights are arranged to surround said plurality of LED turning lights.

2. The decorative LED tail light arrangement according to claim 1, wherein said decorative tail light comprises a circular shape.

3. The decorative LED tail light arrangement according to claim 1, wherein said decorative tail light comprises a squared shape.

4. The decorative LED tail light arrangement according to claim 1, wherein said mirrored double-C pattern of said plurality of LED turning lights is a curved C-shape.

5. The decorative LED tail light arrangement according to claim 1, wherein said mirrored double-C pattern of said plurality of LED turning lights is a squared C-shape.

6. The decorative LED tail light arrangement according to claim 1, wherein said plurality of LED turning lights illuminate an amber color.

7. The decorative LED tail light arrangement according to claim 1, wherein said plurality of LED brake lights illuminate a red color.

8. The decorative LED tail light arrangement according to claim 1, wherein said decorative tail light includes a plurality of reverse lights attached to a bottom portion of said decorative LED tail light.

9. The decorative LED tail light arrangement according to claim 8, wherein said plurality of reverse lights illuminate a while light.

\* \* \* \* \*